United States Patent [19]

Blose

[11] Patent Number: 4,600,225

[45] Date of Patent: * Jul. 15, 1986

[54] TUBULAR CONNECTION HAVING A PARALLEL CHEVRON THREAD

[75] Inventor: Thomas L. Blose, Houston, Tex.

[73] Assignee: Interlock Technologies Corporation, Houston, Tex.

[*] Notice: The portion of the term of this patent subsequent to Jul. 15, 2003 has been disclaimed.

[21] Appl. No.: 565,119

[22] Filed: Dec. 23, 1983

[51] Int. Cl.⁴ .............................................. F16L 15/00
[52] U.S. Cl. ................... 285/334; 285/332.4; 285/390; 285/333; 411/411; 411/423
[58] Field of Search ............... 285/333, 334, 355, 390, 285/332.4; 411/411, 423

[56] References Cited

U.S. PATENT DOCUMENTS

| | | |
|---|---|---|
| Re. 30,647 | 6/1981 | Blose . |
| 137,777 | 8/1919 | Pickard . |
| 671,274 | 4/1901 | Fischer . |
| 1,474,375 | 11/1923 | Moore . |
| 2,543,100 | 12/1948 | Engh . |
| 2,893,759 | 7/1959 | Blose . |
| 3,069,960 | 12/1962 | Baubles ............................ 285/334 |
| 3,224,799 | 12/1965 | Blose . |
| 3,572,777 | 5/1969 | Blose . |
| 4,161,332 | 7/1979 | Blose . |
| 4,192,533 | 3/1980 | Blose . |
| 4,244,607 | 1/1981 | Blose . |
| 4,549,754 | 10/1985 | Saunders et al. .................... 285/334 |

FOREIGN PATENT DOCUMENTS

| | | | |
|---|---|---|---|
| 2041135 | 9/1980 | United Kingdom ................ 411/308 |
| 482577 | 1/1976 | U.S.S.R. ............................ 411/411 |

Primary Examiner—Cornelius J. Husar
Assistant Examiner—Eric K. Nicholson
Attorney, Agent, or Firm—Charles D. Gunter, Jr.

[57] ABSTRACT

A thread form is shown for a tubular connection of the type having a pin member adapted to be made up with a box member to form a pipe joint. The pin member has pin threads with thread crests and thread roots which are adapted to be made up with a mating box member having a complimentary thread structure. The pin thread crests are formed between a stab flank and a load flank of the pin thread. A pin thread has a chevron-shaped load flank for engaging a mating chevron-shaped load flank of the complimentary box member to provide a chevron type interfit between the load bearing flanks. The load flanks of the pin member includes an outer wall portion with a positive slope which provides additional clearance between the complimentary threads on the pin and box members during disassembly to prevent inadvertent hanging-up of the threads.

10 Claims, 7 Drawing Figures

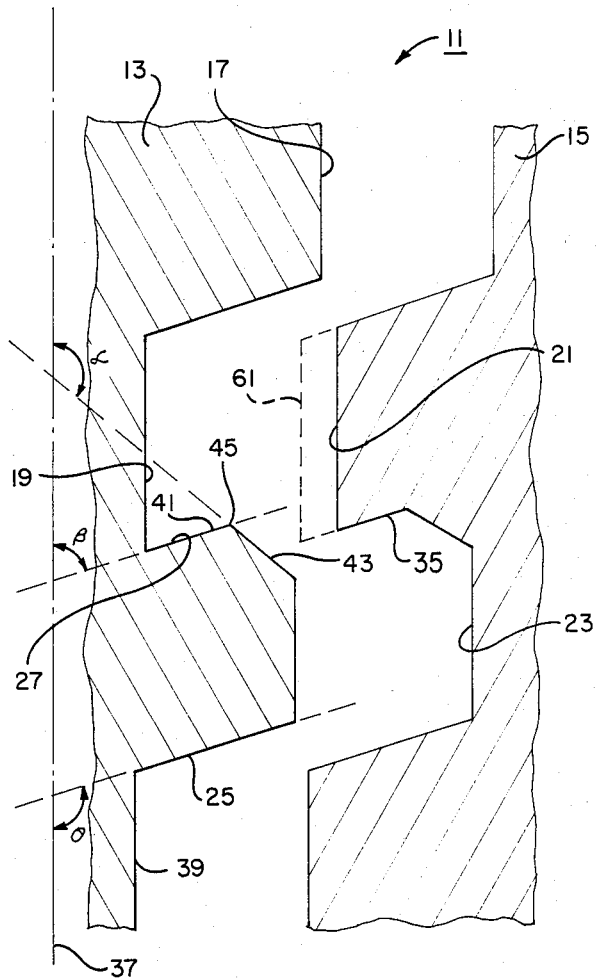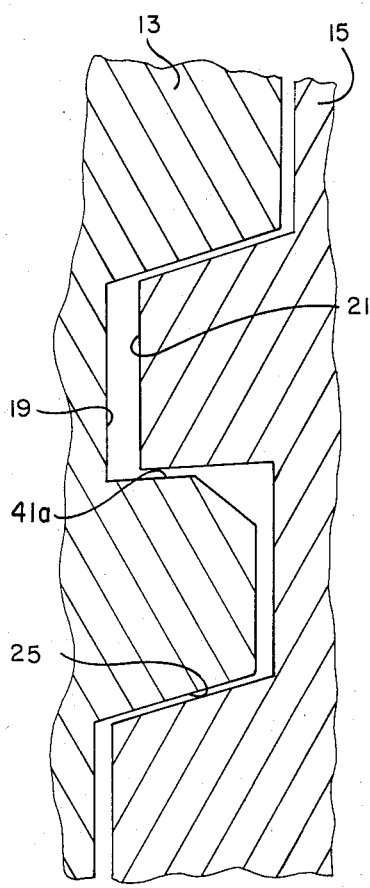

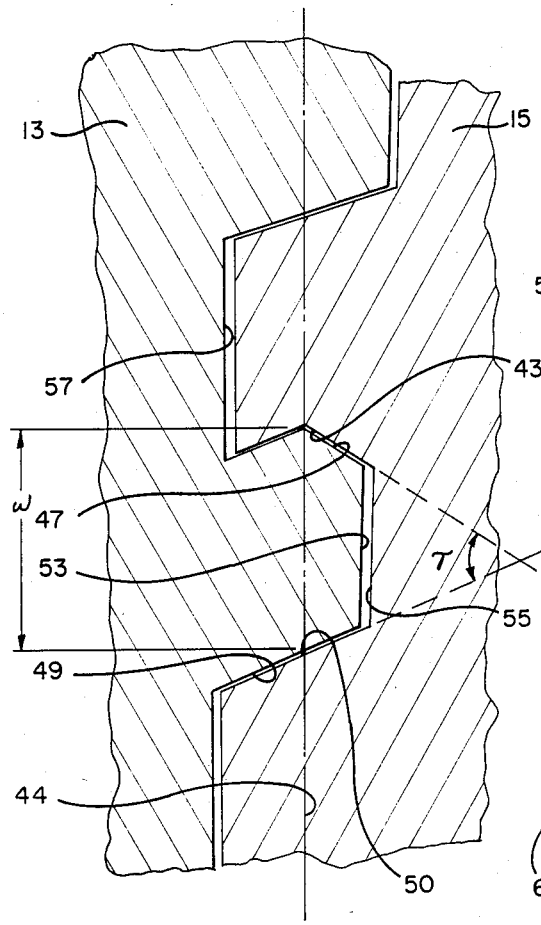
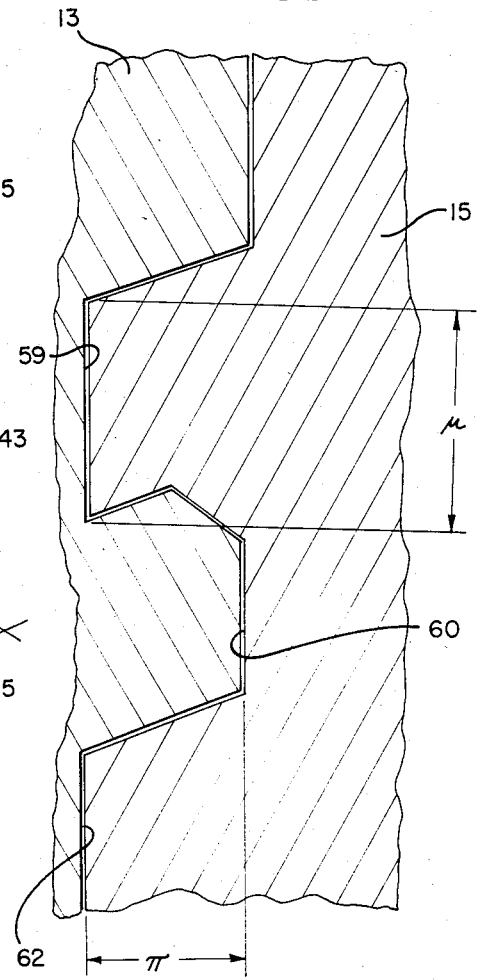
FIG. 3a
FIG. 3b

TUBULAR CONNECTION HAVING A PARALLEL CHEVRON THREAD

BACKGROUND OF THE INVENTION

This application is related to the co-pending application of Thomas L. Blose, entitled "TUBULAR CONNECTION HAVING A CHEVRON WEDGE THREAD", Application Ser. No. 06/565051, filed concurrently herewith.

The present invention relates generally to a thread form for a tubular connection of the type used in tubing, casing and drill pipe, such as is used in gas and oil wells and, specifically, to such a thread form designed with a parallel chevron thread.

Threaded connections for tubular products such as well casing, tubing and pipe can be designed with so-called "hooked" threads. The load flank or pulling flank of such threads forms a negative or acute angle with respect to the longitudinal axis of the tubular connection and hence flares inwardly in the direction of the adjacent thread root. Such threaded connections are also typically formed on pin and box members which are axially tapered. One problem experienced with prior designs of this type is the inherent tendency of such threaded connections to "catch" or "hang-up" momentarily during disassembly while coming out of a well. During disassembly, the female or box member of the tubular connection is normally facing upward and is held stationary while the male or pin member is unscrewed from the box member and generally provides some degree of tension in the threaded connection during disassembly. If the elevator supports the pin member of the connection vertically without swaying, the box and pin members will easily separate along the vertical axis of the pipe. If, however, the elevator supported pin member of the tubular connection is leaning slightly or, if the support hook is swaying, the disengaged threads of the pin member can be pushed to one side to become partially engaged on one side of the box member.

With standard hooked threads as they now exist in the industry, the pin and box members would become "hung-up" until such time that the axial tension load induced by the derrick elevators became high enough to break the engagement, or until the pin member was jarred radially to disengage the members. In either case, the pin and box members of the pipe joint would then pop or jump apart. The recoil reaction which results upon separation of the pin and box members can cause the disengaging pin end to rebound and impact upon the box member causing damage to the threaded connection.

SUMMARY OF THE INVENTION

The thread form of the present invention is designed for use on tubular connections of the type having a pin member to be made up with a box member to form a pipe joint. The pin member has pin threads with thread crests and thread roots which are adapted to be made up with a mating box member having a complimentary thread structure. The pin thread crests are formed between a stab flank and a load flank of the pin thread. The pin thread has a chevron-shaped load flank for engaging a mating chevron-shaped load flank of the complimentary box member to provide a chevron type interfit between the load bearing thread flanks of the pin and box threads.

The pin thread chevron-shaped load flank is made up of an inner wall portion and an intersecting outer wall portion. The inner wall portion forms a negative angle with respect to the longitudinal axis of the tubular connection and with respect to its adjacent thread root whereby the inner wall portion flares inwardly toward the thread root. The outer wall portion forms a positive or outuse angle with respect to the longitudinal axis of the tubular connection and with respect to its adjacent thread root whereby the outer wall portion flares outwardly from the point of intersection with the inner wall portion and from its adjacent thread root. The positive slope of the load flank outer wall portion minimizes the possibility that the hooked thread members of the tapered connection will hang-up during disassembly. By controlling the mating thread fit of the thread form of the invention, the degree of clearance between the complimentary thread crests and thread roots of mating threads can be controlled.

Additinal objects, features and advantages will be apparent in the written description which follows.

BRIEF DESCRIPTION OF THE DRAWINGS

FIG. 2a is an isolated, close-up view of the thread form of the invention during disassembly.

FIG. 2b is an isolated, close-up of the thread form of the invention during disassembly.

FIG. 3a is an isolated, close-up view of the thread form of the invention during assembly.

FIG. 3b is an isolated, close-up view of the thread form of the invention during assembly.

DETAILED DESCRIPTION OF THE INVENTION

Figure 1A:
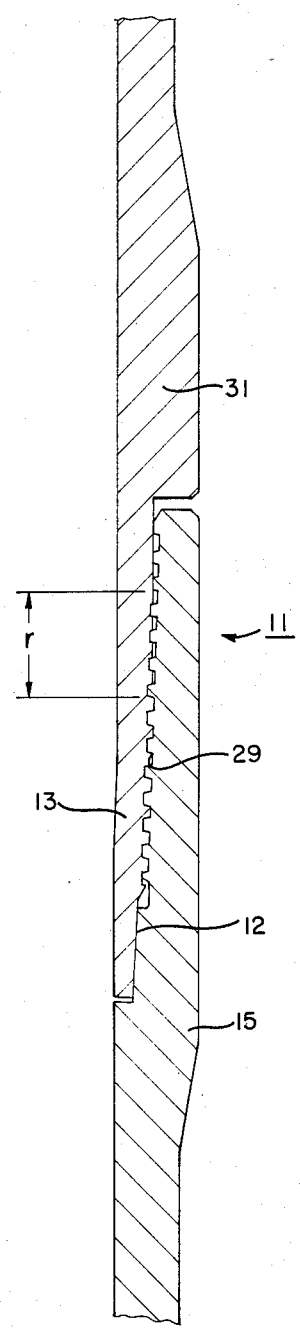
FIG. 1a is a partial, side cross-sectional view of an integral, single step, tapered connection with the thread form of the invention.
Figure 1B:
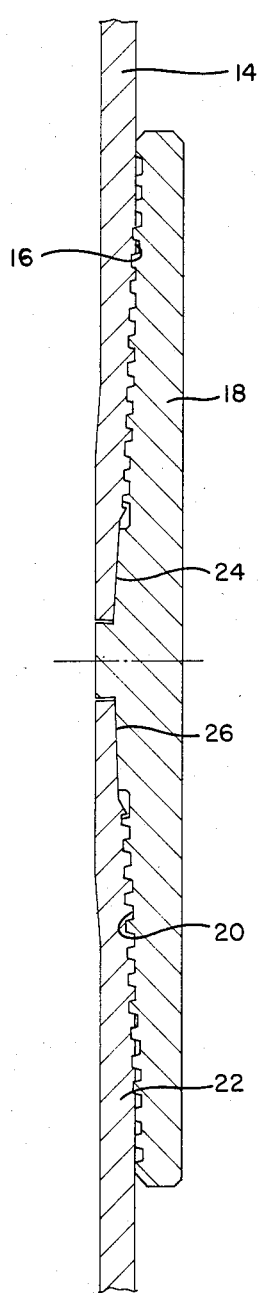
FIG. 1b is a partial, side cross-sectional view of a coupled, single step, tapered connection with the thread form of the invention.
Figure 1C:
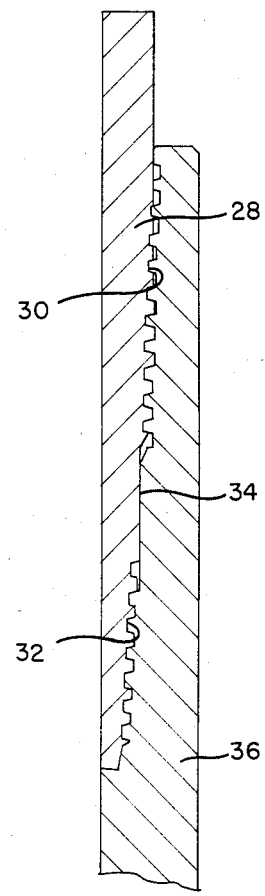
FIG. 1c is a partial, side cross-sectional view of an integral, two step, tapered connection with the thread form of the invention.

FIGS. 1a-1c show three types of tubular connections which feature the thread form of the invention. FIG. 1a shows a tubular connection, designated generally as 11, which has a male or pin member 13 adapted to be made up with a female or box member 15 to form a pipe joint. By the term "pipe" is meant casing, tubing and pipe such as that used in the oil and gas well environment. The particular connection shown in FIG. 1a is a single step, axially tapered connection with a metal-to-metal seal at the area designated generally as 12.

FIG. 1b is another connection employing the thread form of the invention. The connection shown in FIG. 1b is a single step, axially tapered connection having an upper pin member 14 with external threads 16 which are matingly engaged within the upper threaded end of a coupling 18. Coupling 18 also has a lower threaded end 20 for matingly engaging an externally threaded lower member 22. A metal-to-metal seal exists at the areas designed 24, 26.

FIG. 1c is another connection employing the thread form of the invention. The connection shown in FIG. 1c is similar to thread form 1a but is a two step, axially tapered thread. The thread form in FIG. 1c has a pin member 28 with stepped external threads at the areas 30, 32. The pin member 28 is adapted to be threadedly engaged within the mating internal threads of a box member 36 and forms a metal-to-metal seal between the thread steps at the area designated as 34.

Although only three tubular connections embodying the thread form of the invention are shown, it should be understood that other types of connections can be made using the thread form of the invention. For example, the thread form of the invention can be provided in a non-tapered, "cylindrical" connection. By non-tapered is meant that the threads are parallel throughout the thread length to the longitudinal axis of the pipe.

FIG. 2a shows a close-up, schematic view of the thread form of the tubular connection 11 with the threads disengaged for breaking out the joint. As shown in FIG. 2a, the pin member 13 has pin threads with thread crests 17 and thread roots 19 which are adapted to be made up with mating complimentary thread structures of the box member such as the thread crests 21 and thread roots 23 shown in FIG. 2a. The pin thread crests 17 are formed between a stab flank 25 and a load flank 27 of the pin thread.

As can be seen in FIGS. 1a–1c, the threads of the pin member 13 and box member 15 are axially tapered. That is, the box member 15 is provided with fully cut threads 29 throughout the entire threaded portion of the member. The pin member 13 is provided with complimentary threads but these threads gradually diminish in depth as the large diameter end 31 of the thread is approached. This is accomplished by continuing the pin thread roots on the taper helix path established in the full threaded portion until the thread roots reach the outer surface of the pin member. The portion of the thread length of the pin member which becomes progressively shallower in depth is called the vanishing thread or, alternatively, the run-out thread, as indicated at "r" in FIG. 1a. On upset pipe having sufficient upset dimensions, the threads would not necessarily run out but be of full thread depth throughout their length.

As shown in FIG. 2a, the pin member 13 has a chevron-shaped load flank 27 for engaging a mating chevron-shaped load flank 35 of the box member to provide a chevron type interfit between the load bearing thread flanks of the pin and box threads. Although the preferred connection employs a pin member with a chevron-shaped load flank for engaging a mating chevron shaped load flank on the box member, the pin member of the invention can also be used with a box member in which the chevron feature is eliminated. Each groove on the box member would then have parallel flanks as shown in FIG. 2b. The pin thread stab flank 25 forms a positive angle theta with respect to the longitudinal axis of the tubular connection and with respect to the adjacent thread root 39 whereby the stab flank 25 of the pin thread flares outwardly in the direction away from the adjacent pin thread root 39. By "positive" angle is meant that the angle theta is greater than 90 degrees or obtuse with reference to line 37 shown in FIG. 2a.

The pin thread chevron-shaped load flank 27 is made up of an inner wall portion 41 and an intersecting outer wall portion 43 which together form, in effect, a double sloped flank. The inner wall portion 41 forms a negative angle beta with respect to the longitudinal axis 37 of the tubular connection and with respect to its adjacent thread root 19. By "negative" angle is meant that the angle beta is less than ninety degrees or acute with reference to line 37 as shown in FIG. 2a, whereby inner wall portion 41 flares inwardly toward the adjacent thread root 19. The outer wall portion 43 of the chevron-shaped load flank 27 forms a positive angle alpha with respect to the longitudinal axis 37 of the tubular connection and with respect to its adjacent thread root 19 whereby the outer wall portion 43 flares outwardly from the point of intersection 45 with the inner wall portion 41 and from its adjacent thread root 19. The inner wall portion 41 can be parallel to the stab flank 25 but it is preferred to be non-parallel, i.e., the angle beta should be greater than one hundred eighty degrees minus the angle theta for acceptable tool life. The inner wall portion 41 would thus preferably converge from the parallel in the direction of the plane of stab flank 25. This is shown in somewhat exaggerated fashion as 41a in FIG. 2b. With current machining technology, the angle of convergence is preferably fifteen degrees or greater.

The operation of the invention will now be described. The pipe joint is made up by screwing the pin member 13 into the box member 15. FIG. 3a shows a pipe joint with the thread form of the invention in the made-up position. By properly selecting the angles alpha, beta and theta shown in FIG. 2a, and by selecting the proper thread depth to width ratio, the degree of clearance between the complimentary threads crests 53 and thread roots 55 can be controlled. By "thread depth" is meant the radial distance pie between adjacent thread crests 60 and thread roots 62 (FIG. 3b). By "thread width" is meant the axial distance "W" measured along a given thread pitch line (44 in FIG. 3a). The pitch line 44 is drawn throughout the entire thread length at mid, load flank height and is on a slope identical to the taper of the connection.

As shown in FIG. 3a, the pin load flank outer wall portion 47 engages the box load flank inner wall portion 43 when the stab flanks 49, 50 are engaged. Thus, the radial movement of the pin thread crests 53 into the box thread roots 55 is stopped. The relatively wide angle tau formed between the surfaces of load flank engagement 43, 47 and the surfaces of stab flank engagement 49, 50 prevents excessively high wedging bearing pressure on the opposing thread flank surfaces which would induce a tendency toward galling. Thus, radial engagement between the mating thread crests and roots of the pin and box members is safely stopped.

By properly selecting the thread width to depth ratio, a thread form can be provided which allows a radial clearance in the space 57 in FIG. 3a or which provides an interference fit along the surfaces 59 as shown in FIG. 3b. By choosing the amount of clearance at the surfaces 57, 59, control is provided to prevent grease or lubricant entrapment on assembly of the pipe joint or allow a closer fit between the threads to prevent leakage without inducing a galling sensitive interfit between mating threads.

With reference to FIG. 2a, the angle alpha is selected to provide a load flank outer wall portion 43 with a positive slope in an amount sufficient to provide additional clearance from the complimentary box thread load flank 35 to thereby facilitate complete disengagement of the pin and box members during disassembly of the tubular connection. The dotted lines 61 in FIG. 2 show the approximate position of the pin and box member threads during one stage of the disassembly if the elevator supported pin end 13 is held perfectly still. Since there is adequate clearance with respect to the complimentary threads of the two members, the pipe joint should separate and allow the pin member 13 to be pulled up and out of the box member 15. If, however, the derrick elevator supported pin member 13 sways, for instance, normal hooked threads could become temporarily caught or hung-up causing difficulty in disassembly of the pipe joint. By providing a positive slope for the outer wall portion 43 of the pin load flank 27, an additional buffer zone or clearance is provided to prevent inadvertent contact with the complimentary box thread.

An invention has been provided with significant advantages. The positive slope of the chevron-shaped pin thread load flank of the invention minimizes the possibility that the threads will become hung up during disassembly. By eliminating the inadvertent hanging-up of the pin in the box member, "pop-outs" which result in damaged pipe ends are eliminated. As a result, all the advantages of the use of hooked threads can be obtained without the normal disengagement problems which exists with disassembling such thread forms. The chevron type interfit of the load bearing flanks when the stab flanks are engaged can provide either a clearance or an interference fit between the thread roots and crests depending upon the thread width to depth ratio selected for the thread form and the angles alpha, beta and theta.

While the invention has been shown in only two of its forms, it is not thus limited but is susceptible to various modifications and changes without departing from the spirit thereof.

I claim:

1. A thread form for a tubular connection of the type having a pin member adapted to be made up with a box member to form a pipe joint, comprising:

a pin member having pin threads with thread crests and thread roots, said pin thread crests being formed between a stab flank and a load flank of said pin thread and said pin thread having a chevron-shaped load flank made up of an inner wall portion and an intersecting outer wall portion which together form a double sloped flank, the stab flank of the pin thread being formed as a single, uniformly sloped flank extending from thread crest to thread root.

2. A thread form for a tubular connection of the type having a pin member adapted to be made up with a box member to form a pipe joint, comprising:

a pin member having pin threads with thread crests and thread roots which are adapted to be made up with a mating box member having a complimentary thread structure, said pin thread crests being formed between a stab flank and a load flank of said pin thread; and said pin thread having a chevron-shaped load flank made up of an inner wall portion and an intersecting outer wall portion which together form a double sloped flank for engaging a mating chevron-shaped load flank of said complimentary box member to provide a chevron type interfit between the load bearing thread flanks of said pin and box threads, the respective stab flanks of the pin threads and box threads being formed as a single, uniformly sloped flank extending from thread crest to thread root.

3. A thread form for a tubular connection of the type having a pin member adapted to be made up with a box member to form a pipe joint, comprising:

a pin member having pin threads with thread crests and thread roots which are adapted to be made up with a mating box member having a complimentary thread structure, said pin thread crests being formed between a stab flank and a load flank of said pin thread and said pin thread roots being formed as flat, planar surfaces which lie in planes parallel to the longitudinal axis of the tubular connection;

said pin thread having a chevron-shaped load flank for engaging a mating chevron-shaped load flank of said complimentary box member to provide a chevron type interfit between the load bearing thread flanks of said pin and box threads;

wherein said pin thread stab flank forms an obtuse angle theta with respect to the longitudinal axis of the tubular connection and with respect to its adjacent pin thread root whereby the stab flank of said pin thread flares outwardly in the direction away from said adjacent pin thread root.

4. A thread form for a tubular connection of the type having a pin member adapted to be made up with a box member to form a pipe joint, comprising:

a pin member having pin threads with thread crests and thread roots which are adapted to be made up with a mating box member having a complimentary thread structure, said pin thread crests being formed between a stab flank and a load flank of said pin thread;

said pin thread having a chevron-shaped load flank for engaging a mating chevron-shaped load flank of said complimentary box member to provide a chevron type interfit between the load bearing thread flanks of said pin and box threads;

wherein said pin thread stab flank forms an obtuse angle theta with respect to the longitudinal axis of the tubular connection and with respect to its adjacent pin thread root whereby the stab flank of said pin thread flares outwardly in the direction away from said adjacent pin thread root; and wherein said pin thread chevron-shaped load flank is made up of an inner wall portion and an intersecting outer wall portion, said inner wall portion forming an acute angle beta with respect to the longitudinal axis of the tubular connection and with respect to its adjacent thread root whereby said inner wall portion flares inwardly toward said thread root and wherein said outer wall portion forms an obtuse angle alpha with respect to the longitudinal axis of the tubular connection and with respect to its adjacent thread root whereby said outer wall portion flares outwardly from said point of intersection with said inner wall portion and from its adjacent thread root.

5. A thread form for a tubular connection of the type having a pin member adapted to be made up with a box member to form a pipe joint, comprising:

a pin member having pin thread with thread crests and thread roots which are adapted to be made up with a mating box member having a complimentary thread structure, said pin thread crests being formed between a stab flank and a load flank of said pin thread;

said pin thread having a chevron-shaped load flank for engaging a mating chevron-shaped load flank of said complimentary box member to provide a chevron type interfit between the load bearing thread flanks of said pin and box threads;

wherein said pin thread stab flank forms an obtuse angle theta with respect to the longitudinal axis of the tubular connection and with respect to it adjacent pin thread root whereby the stab flank of said pin thread flares outwardly in the direction away from said adjacent pin thread root; and wherein said pin thread chevron-shaped load flank is made up of an inner wall portion and an intersecting outer wall portion, said inner wall portion forming an acute angle beta with respect to the longitudinal axis of the tubular connection and with respect to its adjacent thread root whereby said inner wall portion flares inwardly toward said thread root and wherein said outer wall portion forms an obtuse angle alpha with respect to the longitudinal axis of the tubular connection and with respect to its adjacent thread root whereby said outer wall portion flares outwardly from said point of intersection with said inner wall portion and from its adjacent thread root; and wherein the load flank inner wall portion of said pin member is non-parallel to the stab flank of said pin member, said load flank and stab flank being adapted to engage mating thread portions of said complimentary box member.

6. The thread form of claim 5, wherein said pin and box members are axially tapered.

7. The thread form of claim 6 wherein said angle alpha is selected to provide a load flank outer wall portion with a positive slope in an amount sufficient to provide additional clearance from said complimentary box thread load flank outer wall portion to thereby facilitate complete disengagement of the pin and box members during disassembly of the tubular connection.

8. The thread form of claim 7, wherein the angles alpha, beta and theta are selected so that upon make up of the tubular connection the pin load flank outer wall portion contacts the box load flank inner wall portion when the stab flanks are engaged whereby radial movement of the pin thread crests into the box thread roots is stopped.

9. The thread form of claim 8, wherein the width and depth of said pin and box member threads are selected so that upon engagement of said complimentary load flanks and stab flanks, a clearance exists between complimentary thread crests and thread roots.

10. The thread form of claim 9, wherein the width and depth of said pin and box threads are selected so that, upon engagement of said complimentary load flanks and stab flanks, an interference fit exists between said complimentary thread crests and thread roots when said load flanks and stab flanks are engaged.

* * * * *